(No Model.)
A. B. KING.
CAR DOOR.
No. 271,337. Patented Jan. 30, 1883.
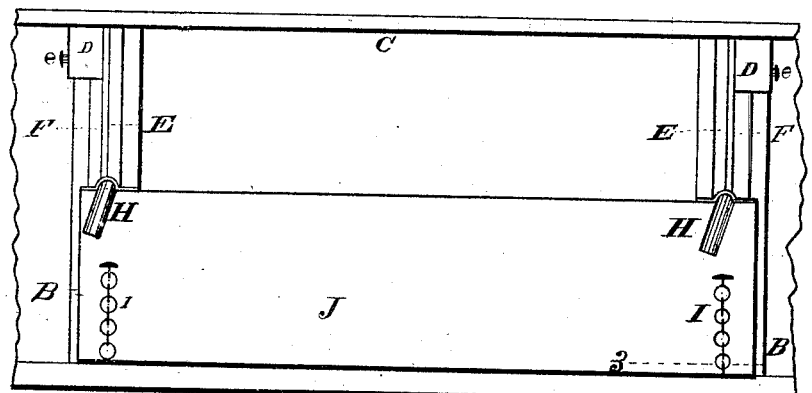
FIG. I.
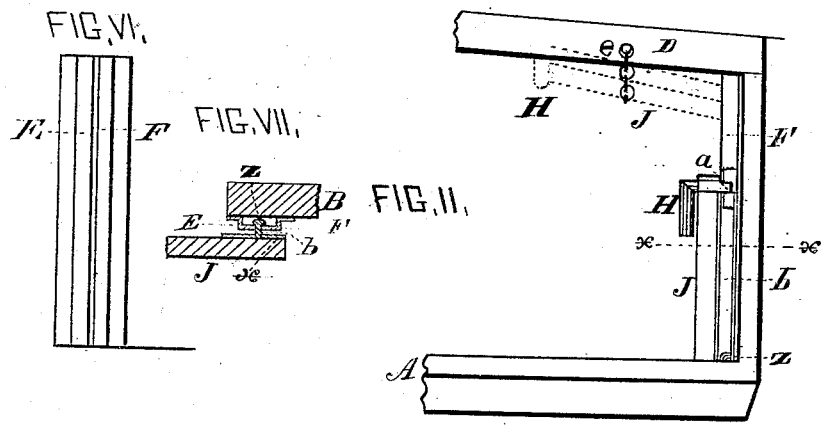
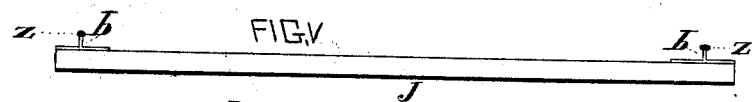
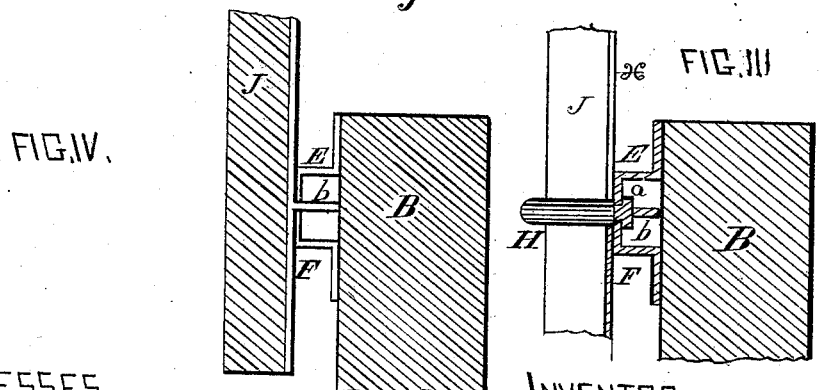
Witnesses
C. M. White
J. S. Huey
Inventor
Amos B. King,
By G. S. Chapin, Atty.

UNITED STATES PATENT OFFICE.

AMOS B. KING, OF LAKE VIEW, ILLINOIS.

CAR-DOOR.

SPECIFICATION forming part of Letters Patent No. 271,337, dated January 30, 1883.

Application filed April 11, 1882. (No model.)

*To all whom it may concern:*

Be it known that I, AMOS B. KING, of Lake View, in the county of Cook and State of Illinois, have invented new and useful Improvements in Car-Doors, of which the following is a specification, reference being had to the accompanying drawings, in which—

Figure I is an inside view of a portion of one side of a car to which my improved door is attached; Fig. II, a transverse section of one side of a car through the vertical door-guides, showing the door closed, and by dotted lines its position when hung to the top of the car; Fig. III, an enlarged top edge view of a portion of the door and a horizontal section of one door-jamb, the guides, and one key; Fig. IV, an enlarged section on line $x\ x$, Fig. II; Fig. V, a top view of the door and its attachments removed from the other parts; Fig. VI, a face view of the door-guides which are attached to the car; Fig. VII, a horizontal section of the device on line 3, Fig. I.

The nature of the present invention consists in a car-door provided with outwardly-projecting vertical guides which run in guides attached to the door-jambs of the car, and extend to the ceiling or roof of the car, so that suitable keys attached to the door may be turned to lock the door to the guides, and so that the door may be raised up and hung to the roof or ceiling of the car. The lower ends of the guides attached to the door are enlarged to hold the bottom of the door in place to the vertical guides when the door is closed or elevated and hung to the roof.

The detail construction is as follows:

A represents the car-floor; D, the beam-supports to the roof, C C being a section of the roof at one side of the car.

B B represent the door-jambs at the opening of the car.

The door is shown at J, and is of ordinary construction, except its attachments. On the outside of this door, and opposite to the slots between the vertical guides E F, are attached guides $b\ b$, extending from the bottom of the door to the top thereof, to run between the guides E F and keep the door level in its upward movement and hold it from moving endwise. The lower ends of these guides $b\ b$ are provided with suitable pieces of iron, riveted thereto or otherwise, as shown at Z, Figs. III and VII, enlarged, so that such enlarged parts operating inside of the guides E F will hold the lower edge of the door to the guides in any position the door may be in.

Keys H H are journaled to the top edge of the door J, opposite to the slots between the guides E F, for the purpose of locking the door to the guides. Those portions of the keys which operate inside of the guides E F are flat, and of such thickness as readily to pass through the slots between said guides, and, as shown at $a$, are wide enough, when turned half round, to engage the insides of the guides E F, and thus lock the door to them.

In the present construction the door will be locked when the stems H of the keys are vertical, and unlocked when the stems are brought to horizontal positions.

The door is hung to the roof of the car by unlocking the keys from the guides E F, raising the door up, the enlarged parts Z running inside of said guides and bringing its top edge forward, as shown by dotted lines H J, Fig. II, and fastening it by chains I, provided for that purpose and hooked over pins $e\ e$.

I claim and desire to secure by Letters Patent—

A car-door provided with the vertical guides $b\ b$, enlarged at Z to hold the door to the guides E F, in combination with said guides, keys H $a$ H $a$, and chains I I, as and for the purpose specified.

AMOS B. KING.

Witnesses:
G. L. CHAPIN,
ADOLF HEIN.